United States Patent [19]

King

[11] 4,084,040
[45] Apr. 11, 1978

[54] CELL CASING AND A HERMETICALLY SEALED SODIUM-SULFUR CELL

[75] Inventor: Randall N. King, Johnstown, N.Y.

[73] Assignee: General Electric Company, Schenectady, N.Y.

[21] Appl. No.: 770,111

[22] Filed: Feb. 28, 1977

[51] Int. Cl.$^2$ .................. H01M 2/02; H01M 10/38
[52] U.S. Cl. ................................. 429/104; 429/185
[58] Field of Search ............ 429/104, 185, 163, 174, 429/176

[56] References Cited

U.S. PATENT DOCUMENTS

| | | | |
|---|---|---|---|
| 3,826,685 | 7/1974 | Dubin et al. | 429/185 X |
| 3,868,273 | 2/1975 | Will et al. | 429/185 |
| 3,881,955 | 5/1975 | Dubin et al. | 429/185 X |
| 3,928,071 | 12/1975 | Thornton | 429/104 X |
| 3,946,751 | 3/1976 | Breiter et al. | 429/218 X |
| 3,959,011 | 5/1976 | Thornton | 429/185 |
| 3,959,013 | 5/1976 | Breiter | 429/185 |

Primary Examiner—Anthony Skapars
Attorney, Agent, or Firm—P. R. Webb, II; Joseph T. Cohen; Jerome C. Squillaro

[57] ABSTRACT

A cathode cell casing and a hermetically sealed sodium-sulfur cell are disclosed. The metallic cathode cell casing is made of one of several specific metals. The cell casing includes also an opposed anode cell casing portion joined to a ring supporting an inner casing of a solid sodium ion-conductive material. A hermetically sealed sodium-sulfur cell has the above type of casing with a sodium negative electrode in the inner casing and a positive electrode of sulfur in conductive material in the cathode casing portion surrounding the inner casing. A high resistance electrical wire is positioned within the inner casing, contacts its closed end and extends to and contacts the interior surface of the anode casing portion.

2 Claims, 2 Drawing Figures

U.S. Patent     April 11, 1978     4,084,040
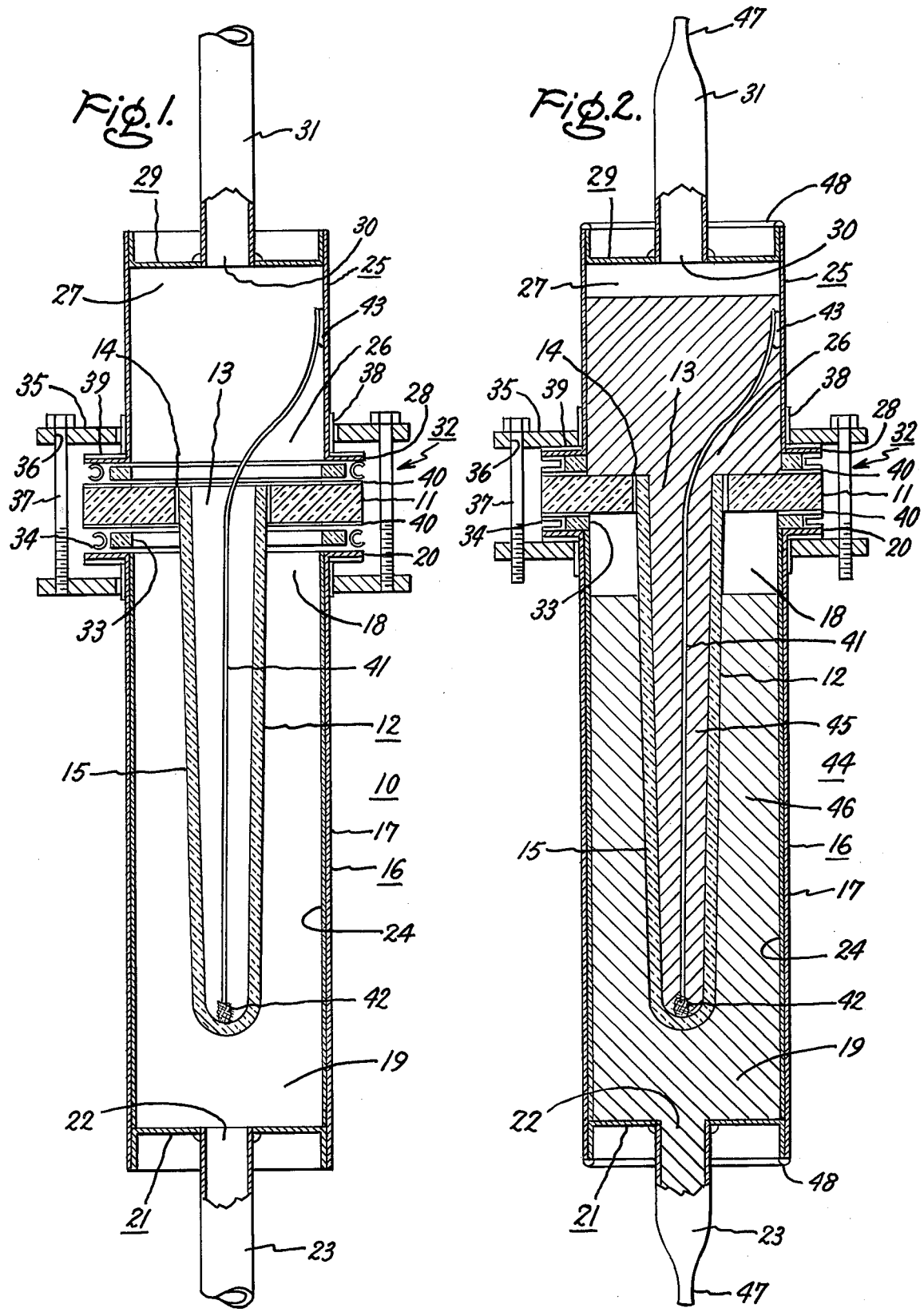

CELL CASING AND A HERMETICALLY SEALED SODIUM-SULFUR CELL

This invention relates to improved cell casings and hermetically sealed cells and, more particularly, to such cell casings, and sealed cells for employment in hermetically sealed sodium-sulfur cells.

Sodium-sulfur cells, which operate at elevated temperatures, are known in the prior art as, for example, described in Kummer et al U.S. Pat. No. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium-sulfur battery can be sodium beta-alumina.

Sodium-sulfur batteries are shown also, for example, in Kummer et al U.S. Pat. No. 3,404,036; in Kummer et al U.S. Pat. No. 3,413,150; Breiter et al U.S. Pat. No. 3,946,751; Breiter U.S. Pat. No. 3,959,013; and Mitoff et al U.S. Pat. No. 3,960,596.

My present invention is directed to providing an improved cell casing and an improved hermetically sealed sodium-sulfur cell over the above-identified patents in that a high resistance electrical wire within the inner casing and the anode casing portion is provided to produce a signal for charge and discharge cycles.

The primary objects of my invention are to provide an improved cell casing and a hermetically sealed sodium-sulfur cell with long life and resistance to corrosion.

In accordance with one aspect of my invention, a cell casing includes a high resistance electrical wire within the inner casing and the anode casing portion.

These and various other objects, features and advantages of the invention will be better understood from the following description taken in connection with the accompanying drawing in which:

FIG. 1 is a sectional view of a cell casing made in accordance with my invention; and FIG. 2 is a sectional view of a hermetically sealed sodium-sulfur cell made in accordance with my invention.

In FIG. 1 of the drawing, there is shown generally at 10 a cell casing embodying my invention which has a ceramic ring 11, an inner casing of a solid sodium ion-conductive material 12 with one open end 13, and a glass seal 14 sealing a portion of the outer wall 15 of inner casing 12 adjacent its open end 13 within and to the ceramic ring 11. A metallic aluminum cathode casing portion 16 has a tubular container 17 with opposite open ends 18 and 19 and a flange 20 at open end 18 surrounds inner casing 12 and is spaced therefrom. A removable closed end 21 for opposite open end 19 of anode tubular container 17 has a fill opening 22 in removable closed end 21, and a fill tube 23 affixed to removable closed end 21 and in communication with the fill opening 22. A corrosion resistant layer 24 of molybdenum adheres to the inner surface of tubular container 17.

A metallic anode casing portion 25 of aluminum has opposite open ends 26 and 27 and a flange 28 at open end 24. Metallic anode casing portion 25 extends in an opposite direction to metallic cathode casing portion 16. A second removable closed end 29 for opposite open end 27 of second outer casing portion 25 has a fill opening 30 in second removable closed end 29, and a fill tube 31 affixed to second removable closed end 29 and in communication with fill opening 30.

Means for joining cathode and anode metallic casing portions 16 and 25 to ceramic ring 11 is shown provided by a hermetic mechanical seal shown generally at 32 thereby forming a continuous outer cell casing. This seal is described and claimed in U.S. Pat. No. 3,946,751 in the names of Manfred W. Breiter, Stephan P. Mitoff and Robert W. Powers and entitled "Cell Casing With a Hermetic Mechanical Seal and a Hermetically Sealed Sodium-Sulfur Cell." This patent is assigned to the same assignee as the present application. Seal 32 comprises a pair of retainer rings 33, each of which is positioned between ceramic ring 11 and an adjacent flange 20 or 28 of outer casing portions 16 and 25, respectively. A pair of open C shaped sealing rings 34 are positioned similarly to rings 33 but surround exteriorly and are spaced from rings 33. The open portion of each C shaped sealing ring faces outwardly. A retaining collar 35 is positioned around each outer metallic casing portion and adjacent to the opposite surface of the casing flange. Each collar 35 has at least a pair of and preferably a plurality of apertures 36 therethrough. The collars are positioned so that the respective apertures 36 are aligned. Threaded fasteners 37, each passing through a pair of associated apertures, are employed to tighten the mechanical seal to produce a hermetic mechanical seal 32. Electrical insulation 38 in the form of glass fiber tape is shown wound around the exterior surface of outer casing portions 16 and 25 adjacent the respective flanges 20 and 26 to prevent shortcircuiting of the cell by seal 28. Electrical insulation 39 in the form of an inorganic fiber cloth ring is positioned between each flange 20 and 28 and the surface of each associated collar 35 to prevent shortcircuiting of the cell by seal 32. While the opposite surfaces of ceramic ring 11 are smooth to insure a good seal, there is shown also a preferred ring 40 of aluminum foil between the opposite surface of retainer ring 33 and sealing ring 34, and the associated surface of ceramic ring 11 to provide a smoother surface. In FIG. 1, seal 32 is shown in position but fasteners 37 have not been tightened to show more clearly the details of the hermetic mechanical seal.

A high resistance electrical wire 41 is positioned within inner casing 12 and casing portion 25. Wire 41 is in contact at one end with the interior surface of the closed end of inner casing 12. In FIG. 1, this is shown by means of a wire mesh 42 attached to the end of wire 41. It will be appreciated that wire 41 can contact such inner surface of inner casing 12 or other configurations that mesh 42 can be employed. The opposite end of wire 41 is in contact with the inner surface of anode casing portion 25. This shown by wire 41 being affixed to a foil 43 which is affixed to the interior surface of anode casing portion 25. External leads (not shown) are attached to cathode casing portion 16 and to anode casing portion 25, respectively. These leads are connected in a circuit including a load, power supply, and a control device for switching between charge and discharge.

I form a cathode cell casing by providing a metallic tubular container with opposite open ends and a flange at one open end. A removable metallic closed end is provided for the other open end. The removable end has a fill opening therein, and a fill tube affixed thereto and in communication with the fill opening. The cathode cell casing portion including the tubular container and the removable end can be formed of a metal such as molybdenum, aluminum, steel, stainless steel, and iron-nickel-cobalt alloys. A corrosion resistant and electronically conducting layer can be applied and adhere to the inner surface. The corrosion resistant and electronically conducting layer is formed of a material selected from the class consisting of molybdenum and graphite.

The above metals for the cathode cell casing portion are desirable cathode container materials. However, during operation of a sodium-sulfur cell, the polysulfide melting in the cathode casing portion may corrode the metal container material by forming films on the inner surface thereof. These films increase the contact resistance between the inner walls of the cell and the conductive material of the positive electrode thereby resulting in an increase of the internal resistance of the cell.

The above corrosion and corresponding film formation can be eliminated by providing a corrosion resistant layer adhering to the inner surface of the cell casing portion. Molybdenum and graphite provide such a corrosion resistant layer. One suitable method of applying and adhering the molybdenum layer to the inner surface of the cell casing portion is to plasma spray such surfaces with a thin layer of molybdenum. One suitable method of applying a similar layer of graphite is to provide a mixture of graphite and a binder, such as Aquadag, which is manufactured by Joseph Dixon Crucible Co., Jersey City, N.J. and which is a suspension of graphite in water, and to paint the binder on the inner surface of the cell casing portion. The cathode cell casing portion is then heated to 400° C and maintained at this temperature for two hours resulting in the removal of the binder and the formation of a thin graphite coating.

I form a cell casing employing the above-described cathode cell casing portion by providing a ceramic ring with opposite smooth surfaces of alpha-alumina. An inner casing of a solid sodium ion-conductive material of sodium betaalumina with one open end has a portion of its outer wall adjacent its open end sealed within and to the ceramic ring with a glass seal.

A cathode cell casing portion of the above type with opposite open ends and a flange at one open end adjacent the ceramic ring is positioned around the inner casing and is spaced therefrom. A removable metallic or nonmetallic closed end is provided for the opposite open end of the cathode cell casing portion. This closed end has a fill opening therein and a fill tube affixed thereto and is in communication with the fill opening. An anode cell casing portion made of the same metal as the cathode cell casing portion with opposite open ends and a flange at one open end is positioned with the flange adjacent the ceramic ring whereby the anode cell casing portion is spaced from and extends in an opposite direction to the cathode cell casing. A metallic removable closed end is provided for the opposite open end of the cathode cell casing portion. This closed end has a fill opening therein and a fill tube affixed thereto and is in communication with the fill opening. Such a cell casing can be formed as described above but that either or both cell casing portions can be provided with a closed end rather than a removable closed end.

A high resistance electrical wire is positioned within the inner casing and the anode casing portion. The wire is in contact at one end with the interior surface of the closed end of the inner casing, for example, by means of a wire mesh attached to the end of the wire. The wire can contact the inner surface of the inner casing or other configurations than the mesh can be employed. The opposite end of the wire is in contact with the inner surface of the anode casing portion. The wire can be affixed to a foil which is affixed to the interior surface of the anode casing portion.

The cell casing portion can be joined to the ceramic ring by a hermetic mechanical seal thereby forming a continuous outer battery casing. The seal comprises a pair of retainer rings, each of which is positioned between the ceramic ring and an adjacent flange of the outer casing portion. A pair of open C shaped sealing rings are positioned similarly to the retainer rings but surround exteriorly and are spaced from the retainer rings. The open portion of each C shaped sealing ring faces outwardly. A retaining collar is positioned around each outer metallic casing portion and adjacent to the opposite surface of the casing flange. Each collar has at least a pair of and preferably a plurality of apertures therethrough. The collars are positioned so that the respective apertures are aligned. Threaded fasteners, each passing through a pair of associated apertures, are employed to tigten the mechanical seal to produce a hermetic mechanical seal. Electrical insulation is provided around the exterior surface of the outer casing portions adjacent the associated flanges and between each flange and the associated collars to prevent short-circuiting of the cell by the seal. While fiberglass tape is described around the exterior surface of the casing and inorganic fiber cloth between each flange and its associated collar, it will be appreciated that a variety of electrical insulation materials can be employed. While a smooth faced ceramic ring insured a good seal, it is preferable to employ a ring of material such as aluminum foil to produce an even smoother surface. In FIG. 1, the seal is shown in position but the fasteners have not been tightened to show more clearly the details of the hermetic mechanical seal.

Retainer rings of stainless steel or aluminum are preferred but other metallic and non-metallic materials can be employed. The sealing rings are resilient metallic open edge rings in configuration such as a C shaped ring or a W shaped ring. An open edge metallic C shaped ring made of Inconel alloy is preferred but other metals can be employed. Such open edge metallic sealing rings are commercially available, for example, from Pressure Science Inc., 11,842 Old Baltimore Pike, Beltsville, Md. The open edge of the sealing ring can face in either direction but it is preferred to have the open edge facing toward the exterior of the cell. This particular sealing ring is provided because of its corrosion resistance when employed in a cell. When the threaded fasteners are tightened and a pressure from about 300 lbs. and above is applied by the retaining collars and threaded fasteners, a hermetical seal which is helium-leak-tight on thermal cycling is produced for the casing. The above hermetic mechanical seal is described in above-mentioned U.S. Pat. Nos. 3,946,751 and 3,959,013.

It is understood that other types of seals can be employed, for example, glass seals each cell casing portion flange and the associated surface of the ceramic ring is described in U.S. Pat. No. 3,960,596. As described in this patent, for each of the seals, glass is provided initially in the form of a washer. Each washer is positioned between adjacent associated parts to be sealed. The glass washers are made of a suitable sodium and sulfur resistant glass such as Corning glass No. 7052, General Electric Company glass No. 1013, Sovirel glass No. 747 or Kimble glass No. N-51A. The associated components with the glass washer therebetween are heated to a temperature in the range of 950° C to 1250° C in an argon atmosphere whereby the glass seals together the associated component. The upper portion of the outer wall of the inner casing is sealed in this manner within and to the interior surface of the ceramic ring. Each outer casing is sealed separately to the ceramic ring in the same manner. The end of each outer casing can be provided with an outwardly or inwardly extending flange for such sealing to the ceramic ring. Further, the end of each outer casing can be sealed to the perimeter of the ceramic ring.

Either or both of the outer casing portions can be provided with an open end and a flange at the open end with the other end closed. Further, either or both of the outer casing portions can be both opposite open ends and a flange at one open end. A removable closed end is then provided for the opposite open end of each of the outer casing portions.

FIG. 2 of the drawing, there is shown a hermetically sealed sodium-sulfur cell 44 employing cell casing 10 of FIG. 1. The hermetic mechanical seal is shown in its tightened or hermetic position. A negative electrode 45 of sodium metal is positioned preferably within inner casing 12 and partially within aluminum casing anode portion 25. A positive electrode 46 of sulfur in an electrically conductive material is positioned preferably within aluminum cathode casing 16 and is in contact with outer wall 15 of inner vessel 12 and with corrosion resistant layer 24 adhering to the interior surface of container 17. A void volume is provided between ceramic ring 11 and the upper portion of positive electrode 46 to provide space for reactant during operation of the cell. Fill tubes 23 and 31 are shown closed in any suitable manner such as by respective welds 47. Closed ends 21 and 29 are affixed to outer casing portions 16 and 25, respectively, as by welding at 48. The resulting structure is a hermetically sealed sodium-sulfur cell.

In one embodiment, I form a hermetically sealed sodium-sulfur cell by employing the above-described cell casing. The hermetic mechanical seal is in its tightened or hermetic position. The negative electrode, which consists of sodium metal is positioned preferably within the inner casing and its associated anode casing portion. The high resistance electrical wire contacts the interior surface of the closed end of the inner casing and is affixed to the interior surface of the anode casing portion. The positive electrode is positioned preferably within the cathode casing portion surrounding the inner casing and is in contact with the exterior surface of the inner casing with the interior of the cathode casing portion except for a void volume at the upper end adjacent the ceramic ring. The inner casing and a portion of the associated anode casing portion are filled with sodium metal by filling the inner casing and by filling partially the associated anode casing portion through the fill tube and fill opening with molten sodium. The fill tube is then closed, for example, by crimping or by welding. In this manner there is a hermetically sealed negative electrode reactant compartment for the cell. The positive electrode, which consists of sulfur in a conductive material, is then positioned within the other outer casing portion of the cell. This is accomplished, for example, by positioning an electrically conductive material such as carbon felt within this outer casing portion. This outer casing portion is filled with carbon or graphite felt, hereinafter referred to as graphite felt, so that it contacts the exterior surface of the inner casing, the inner surface of the cathode casing portion, extends to the initially open end of the surrounding cathode casing portion, and provides a void volume adjacent the ceramic ring. The closed end is then welded to the outer casing portion. Molten sulfur is then filled into this cathode casing portion through the associated fill tube and fill opening, and allowed to solidify within the graphite felt thereby providing the positive electrode. The fill tube is then closed, for example, by crimping or by welding. The filling tubes enable the evacuation of the cell compartments at temperatures up to 600° C with subsequent introductions of sodium and sulfur, respectively, into the evacuated compartments without contact with the atmosphere. The resulting structure is a hermetically sealed sodium-sulfur cell.

In another embodiment I form a hermetically sealed sodium-sulfur cell by employing the above-described casing. The hermetic mechanical seal is in its tightened or hermetic position. The negative electrode which consists of sodium metal is positioned preferably within the inner casing and its associated anode casing and its associated anode casing portion. The high resistance electrical wire contacts the interior surface of the closed end of the inner casing and is affixed to the interior surface of the anode casing portion. The positive electrode is positioned preferably within the cathode casing portion and surrounds the inner casing and is in contact with the exterior surface of the inner casing and with the interior of the cathode casing portion except for a void volume at the upper end adjacent the ceramic ring. In this embodiment the anode casing portion has an open end and a flange at the open end and the opposite end is closed. The inner casing and a portion of the associated outer casing are filled with sodium metal in accordance with the method set forth in U.S. Pat. No. 3,740,206 issued June 19, 1973 and entitled "Method for Making Sealed Container for Elemental Sodium and Method of Forming." This patent is assigned to the same assignee as the present application. This patent and its subject matter is hereby incorporated by reference into the present application. Initially, the anode casing with its closed end is joined to the ceramic ring by the above-described hermetic mechanical seal. The cathode casing portion and associated retaining ring and open edge sealing ring are not used. Since the anode casing portion is closed ended at the end opposite its flanges, it is necessary to provide an electronic conductor in the form of a wire lead which extends through the second outer, casing into the inner casing and in contact with the closed end of the inner casing. As set forth in the above-identified patent, the inner casing is immersed at least partially in a bath provided with sodium ions, the electronic conductor is connected to the negative terminal of a DC power source and a suitable electrode in the bath is connected to the positive terminal of the same source. A D.C. potential is applied across the inner casing thereby filling the casing with pure elemental sodium. The inner casing is removed from the bath and the hermetic seal is removed. The cathode casing portion, associated retaining ring and associated open end sealing ring are then tigthened. The cathode casing has a removable end portion with an associated fill tube. The positive electrode, which consists of sulfur in a conductive material, is then positioned within the outer casing portion of the cell. This is accomplished, for example, as above-described by positioning an electrically conductive material such as graphite felt within this outer casing portion. This outer casing portion is filled with graphite felt so that it contacts the exterior surface of the inner casing, the inner surface of the cathode casing portion, extends to the initially open end of the surrounding cathode casing portion and provides a void volume adjacent the ceramic ring. The closed end is then welded to the outer casing portion. Molten sulfur is then filled into this outer casing portion through the associated fill tube and fill opening, and allowed to solidify within the graphite felt thereby providing the positive electrode. The fill tube is then closed, for example, by crimping or by welding. The resulting structure is a hermetically sealed sodium-sulfur cell.

Additionally, a closed end cathode outer casing portion can be used in my invention. The cell is provided with a sulfur in an electrically conductive material positive electrode within the first outer casing by employing the sulfur in a graphite felt sheet which is wound around the exterior of the inner casing prior to attaching and sealing the first outer casing portion to the cell as described previously. This is accomplished, for example, in accordance with U.S. Pat. No. 3,770,502 issued Nov. 6, 1973 and entitled "Sodium-Sulfur Storage Battery." This patent and its subject matter is hereby incorporated by reference. Such a positive electrode of sulfur in an electrically conductive material such as graphite felt can be preformed, and positioned within the first outer casing portion which is then attached and sealed to the cell as described previously. However, our positive electrode of sulfur in an electrically conductive material is in contact with the exterior surface of the inner casing and with the interior surface of the first outer casing portion.

For operation of this cell, an appropriate heating device (not shown) surrounds the cell to provide a necessary operating temperature of between 285° and 400° C. Such a heating device can take various conventional forms such as a heating coil or a furnace. In the operation of the present sodium-sulfur cell within its elevated operating temperature during its discharge half cycle sodium ions are passed into the sulfur reactant within the cathode compartment of the cell on the opposite side of the solid sodium ion-conductive material tube. When the sodium atoms are ionized, they release electrons which are carried from the negative electrode compartment by an electric lead (not shown) to the positive electrode. In this manner electric energy is generated. While a single cell casing and a single hermetically sealed sodium-sulfur cell are described above, it will, of course, be appreciated that a multi-tube cell or a plurality of these single cells can be used to provide a useful multicell battery.

U.S. Pat. Nos. 3,579,382; 3,660,063; 3,607,405 and 3,740,206 relate to sealed containers for elemental sodium. These patents are assigned to the same assignee as the present application. In particular, U.S. Pat. No. 3,740,206 describes a method of forming an evacuated, sealed container for pure elemental sodium and a method for filling the container with pure elemental sodium. The sealed container includes a sodium beta-alumina electronic conductor in contact with the interior surface of the casing and extending outwardly from the sealed casing. The electronic conductor is discussed in detail in this patent in column 3, lines 39–62. As pointed out in lines 43–47, the electronic conductor is employed initially during the filling of the container and subsequently can be employed as the electrical lead for the anode when used in a sodium-sulfur battery. In lines 61 and 62, metals for such an electronic conductor include nickel, stainless steels, Armco iron, etc.

As opposed to the above patents, I found that I could employ a high resistance wire within the inner casing and anode casing portion of the above-described sodium cells to provide an effective control for charging and discharging such cells. Such a suitable wire is a Nichrome alloy wire. The wire is in contact with the interior surface of the closed end of the inner casing and in contact with the interior. The need for such control is to prevent cells from being too deeply discharged with possible harmful effects to the beta-alumina inner casing and possible inability to subsequently charge the cell. The high resistance wire allows the sodium-sulfur cell to be discharged to a safe limit without losing electrical connection to the cell.

In the discharge reaction of the sodium-sulfur cell, the sodium is consumed. The sodium is not only a reactant but also provides electrical contact to the anode cell portion. If on discharge, the sodium is reacted too far, an open circuit may occur between the sodium and the electrical collecting system. As the sodium depth in a cell is lowered the current density is increased because of diminishing surface area. This may be very harmful to the solid electrolyte.

The present invention provides a control in the form of a high resistance wire to actuate the discontinuing of the discharge of the sodium-sulfur cell when the sodium level reaches a pre-determined level. This control has the advantage of maintaining an even current distribution in the cell during the later phases of discharge and provides a signal to curtail discharge when the sodium content approaches a low level.

When the supply of sodium is plentiful the high resistance wire or control is electrically in parallel with the sodium and therefore does not function. The sodium providing the means for contact to the anode casing portion wall which serves as the collector. External leads are attached to the anode casing portion wall and to the cathode casing portion. These leads are connected in a circuit including a load, power supply and a control device for switching between charge and discharge. As the cell continues to discharge it reaches a point where the sodium reaches the top of the inner casing. The sodium is no longer in contact with the anode casing portion wall and no longer provides a means for electrical connection. The high resistance wire provides the means for completeing the circuit. The resistance of the wire increases the resistance in the load circuit thereby lowering the current in the circuit causing a rise in cell voltage. This voltage change can then be used to start the cell on charge or disconnect the cell from the system.

It the wire was of low resistance, such as nickel, the cell would continue to discharge. As the sodium level lowers the surface area decreases which in turn increases the current density on the solid electrolyte. The continuing discharge could deplete all the sodium making it difficult or impossible to charge subsequently the cell.

A simple circuit in which the high resistance wire acts as a control could include a main controller, such as, a meter relay, whose contacts are actuated by a voltage. The cell connected to an external load through the contracts of a relay. The voltage of the cell is also connected to the meter relay. As the sodium is consumed the level in the cell is reached where it no longer provides electrical contact to the anode casing portion. At this time only the high resistance wire provides contact. This resistance being in series with the load causes the total circuit resistance to increase. A corresponding rise in cell voltage will activate the relay and its contacts will cause the cell to be disconnected from the load and connected to the power supply. When the cell is fully charged its voltage will rise and this increase signal can be used to switch from charge to load.

Examples of cathode cell casings and hermetically sealed sodium-sulfur cells made in accordance with my invention are set forth below.

EXAMPLE I

A cell casing was assembled generally as above-described and as shown in FIG. 1. A cathode cell casing portion was formed by providing a tubular stainless steel container with opposite open ends and a flange at one open end, and a removable stainless closed end for the opposite open end of the container. The removable end had a fill opening therein, and a fill tube affixed thereto and in communication with the fill opening. An alpha-aluminum ceramic ring was provided. An inner casing of a solid sodium ion-conductive material of sodium beta-aluminum with one open end which has a portion of its outer wall adjacent its open end is sealed within and to the ceramic ring with General Electric Company glass No. 1013. The stainless steel cathode casing portion with a closed end and an open end and a flange at the open end was provided for subsequently surrounding the inner casing and being spaced therefrom.

An aluminum anode casing portion was provided with opposite open ends and a flange at one open end. The anode casing portion extended in an opposite direction to the cathode casing portion. The anode casing portion included a removable aluminum closed end for the opposite open end of the anode casing portion. This closed end had a fill opening therein and a fill tube affixed thereto and was in communication with its associated fill opening. One end of a high resistance electrical wire of a No. 28 gauge Nichrome alloy was welded to the interior wall of the anode casing portion by means of a piece of foil attached to the wire end. The wire was positioned within the anode casing portion and within the inner casing. The opposite end of the wire is in contact with the interior surface of the closed end of the inner casing by means of a wire mesh attached to the end of the wire.

The anode and cathode casing portions were joined to the ceramic ring by a hermetic mechanical seal thereby forming a continuous outer cell casing. The seal comprised a pair of metal retainer rings, each of which was positioned between the ceramic ring and an adjacent flange of the associated outer casing portion. A pair of open Inconel alloy C shaped sealing rings were positioned similarly to the retainer rings but surrounded exteriorly and were spaced from the retainer rings. The open portion of each C shaped sealing ring faced outwardly. A retaining collar was positioned around each outer metallic casing portion and adjacent to the opposite surface of the casing flange. Each collar had at least a plurality of apertures therethrough. The collars were positioned so that the respective apertures were aligned. The collars were insulated electrically from each outer casing portion. Threaded fasteners, each passing through a pair of associated apertues, were employed to tighten the mechanical seal to about 300 lbs. of pressure to produce a hermetic mechanical seal. During tightening the mechanical seal, the open C shaped rings were partially closed. The resulting structure was a cell casing made in accordance with my invention.

EXAMPLE II

A hermetically sealed sodium-sulfur cell was assembled as described above and as shown in FIG. 2 by providing an alpha-alumina ceramic ring, and an inner casing of a solid sodium ion-conductive material of sodium-beta-alumina with one open end which has a portion of its outer wall adjacent its open end sealed within and to the ceramic ring with General Electric Company glass No. 1013. The stainless steel cathode casing portion of Example I with a closed end and an open end and a flange at the open end was provided for subsequently surrounding the inner casing and being spaced therefrom.

An aluminum anode casing portion was provided with a closed end and an open end and a flange at the open end. The anode casing portion with a length of one centimeter extended in an opposite direction to the subsequently joined cathode metallic casing portion. The anode casing portion was provided with a high resistance wire of No. 28 Nichrome alloy welded to its interior surface by means of a foil at its one end. The anode casing portion had the flange at its open end positioned adjacent the ceramic ring whereby the wire extended into and was in contact with the interior surface of the closed end of the inner casing by contacting the surface with a metallic mesh attached to the end of the wire. Initially, only the anode casing was joined to the ceramic ring by the previously above-described hermetic mechanical seal in Example I. Thus, this seal comprised a retainer ring and an open edge C shaped sealing ring between the outer edge of the casing flange and the ceramic ring. A retaining collar was positioned on the opposite side of the flange and insulated electrically from the flange and the associated portion of the second outer casing portion. A similar retaining collar was positioned on the opposite side of the ceramic ring and threaded fasteners were inserted through aligned openings in the respective collars. The threaded fasteners were then tightened to about 300 lbs. of pressure to provide a hermetic seal between the second outer casing portion and the ceramic ring. The inner casing and a portion of the second outer casing was then filled with sodium in accordance with the above-mentioned U.S. Pat. No. 3,740,206 by immersing the inner casing in a bath containing sodium ions after which the external portion of the electronic conductor was connected to the negative terminal of the D.C. source and the bath was connected to the positive terminal of the same source. A D.C. potential was then applied across the inner casing thereby filling the casing and filling partially the second outer casing portion. The inner casing was then removed from the bath and the sodium allowed to solidify. The threaded fasteners were untightened and the lower retaining collar was removed. Since the sodium had solidified prior to the removal of the threaded fasteners, the upper casing was sealed to the ceramic ring by means of the solidified sodium whereby the one portion of the hermetic seal was not destroyed.

A positive electrode of sulfur in graphite felt in a preformed shape with a central opening therethrough was positioned within the cathode casing portion. The cathode casing was joined to the ceramic ring by the previously above-described hermetic mechanical seal in Example I. The positive electrode was in contact with the exterior surface of the inner casing and the interior surface of the cathode casing. A similar retaining ring and open edge C sealing ring were provided between the flange of the first outer casing portion and the ceramic ring. A portion of the inner casing adjacent the ceramic ring was not provided with positive electrode material to provide a void volume. The lower retaining collar was positioned around the opposite surface of the flange of the cathode casing portion. The threaded fasteners were reinserted and were tightened to a pressure of about 300 lbs. to provide a complete hermetic mechanical seal. As it was discussed above, electrical insulation was provided between the respective flanges and retaining collars, and between the respective area of the outer casing portions and the retaining collars to prevent electrical short-circuiting of the cell. The resulting structure was a hermetically sealed sodium-sulfur cell made in accordance with my invention.

EXAMPLE III

The hermetically sealed sodium-sulfur cell in Example II had a high resistance wire of No. 28 gauge Nichrome alloy welded to the interior wall of the anode casing portion by means of a foil attached to the wire end. The wire was positioned within the anode casing portion and within the inner casing. The opposite end of the wire was in contact with the interior surface of the closed end of the inner casing by means of a wire mesh attached to the end of the wire. The anode casing portion had a length of one centimeter. The resistance of the wire was 0.14 ohm. The cell was filled electrochemically with 17.5 amp-hours of sodium. 3.37 amp-hours was needed to fill the inner casing, while the remaining 14.13 amp-hours of sodium filled the sodium anode casing portion. External leads were attached to the anode casing portion and the cathode casing portion, respectively. These leads were connected in a circuit including a load, a power supply, and a control device as described above for switching between cell charge and discharge.

The low limit cut-off for the cell discharge was set at 1.3 volts. After the cut-off voltage was reached, the cell was switched automatically to charge. A constant discharge current of 2 amps was used to discharge the cell. When all the sodium in the sodium anode cell portion had been utilized, the high resistance wire of Nichrome alloy was carrying the cell current. At this point, an immediate loss of approximately 0.3 volt was noted in the cell voltage and the 1.3 volt low limit cut-off was reached, thereby terminating the dischage and commencing charging of the cell. In this manner the cell went on charge with the inner casing filled with sodium and without any interior exposed areas of the inner casing. Thus, the inner casing was not subjected to high currents due to loss of sodium within the casing thereby preventing possible pitting and cracking.

During the charging of the cell, a higher charging voltage is initially shown as the Nichrome alloy wire resistance effects the charging voltage. In a very short time the Nichrome alloy wire no longer functions as the electrical conductor and the charging voltage drops to its normal level.

EXAMPLE IV

Another hermetically sealed sodium-sulfur cell was made in accordance with above Example III except that a low resistance wire of nickel was employed rather than the high resistance wire No. 28 gauge Nichrome alloy wire. This cell was not made in accordance with my invention. The nickel wire was used in the same fashion as in the cell of Example II. The cell was filled electrochemically with 17.5 amp-hours of sodium. 3.37 amp-hours was needed to fill the inner casing, while the remaining 14.13 amp-hours of sodium filled the sodium anode casing portion. As in Example III, external leads were attached to the anode casing portion and the cathode casing portion, respectively, of the present cell. These leads were connected in the same type of circuit as in Example III; which includes a load, a power supply, and a control device for switching between cell charge and discharge.

The low limit cut-off for the cell discharge was set at 1.3 volts. After the cut-off voltage was reached, the cell was switched automatically to charge. A constant discharge current of 2 amps was used to discharge the cell.

After all of the sodium in the sodium anode cell portion had been utilized, there was only a slight drop in voltage of approximately 0.06 volts. The cell continued to discharge until another 1¼ amp-hours of sodium was removed thereby exposing approximately 45% of the interior of the casing. The unexposed area had to carry all of the current. At this point in time, a sufficient voltage loss was sustained whereby the 1.3 volt low limit cut-off was reached thereby terminating the discharge and commencing charging of the cell.

While other modifications of the invention and variations thereof which may be employed within the scope of the invention have not been described, the invention as intended to include such as may be embraced within the following claims.

What I claim as new and desire to secure by Letters Patent of the United States is:

1. A cell casing comprising an electrically insulated ring, an inner casing of a solid sodium ion-conductive material with one open end, a glass seal sealing a portion of the outer wall of the inner casing adjacent its open end within and to the ring, a metallic cathode casing portion with at least one open end and a flange at the open end, the cathode casing portion surrounding the inner casing and spaced therefrom, the flange of the cathode casing portion adjacent the ceramic ring, a metallic anode casing portion with at least one open end and a flange at the open end positioned with the flange adjacent the ring whereby the anode casing portion is spaced from and extends in an opposite direction to the cathode casing portion, the anode casing portion selected from the same metal as the cathode casing portion, a high resistance electrical wire positioned within the inner casing, the wire in contact at one end with the closed end of the inner casing and in contact at the other end with the anode casing portion, and means for joining the cathode and anode casing portions to the ring thereby forming a continuous outer cell casing.

2. A hermetically sealed sodium-sulfur cell comprising a ring, an inner casing of a solid ion-conductive material with one open end, a glass seal sealing a portion of the outer wall of the inner casing adjacent its open end within and to the ceramic ring, a metallic cathode casing portion with an open and a closed end and a flange at the open end, the cathode casing portion surrounding the inner casing and spaced therefrom, the flange of the cathode casing portion adjacent the ring, a metallic anode casing portion with an open and a closed end and a flange at the open end positioned with the flange adjacent the ceramic ring whereby the anode casing portion is spaced from and extends in an opposite direction to the cathode casing portion, the anode casing portion selected from the same metal as the cathode casing portion, a high resistance electrical wire positioned within casing, the wire in contact at one end with the closed end of the inner casing and in contact at the other end with the anode casing portion, and means for joining the cathode and anode portions to the ceramic ring thereby forming a continuous outer cell casing, a sodium negative electrode in the inner casing and in the anode casing portion, and a positive electrode in the cathode casing portion surrounding the inner casing and contacting the outer wall of the inner casing and the inner wall of the cathode casing portion, the positive electrode comprising sulfur in electrically conductive material.

* * * * *